(12) United States Patent
Chen

(10) Patent No.: US 10,021,180 B2
(45) Date of Patent: Jul. 10, 2018

(54) UNIVERSAL ENVIRONMENT EXTENDER

(71) Applicant: Kingston Digital, Inc., Fountain Valley, CA (US)

(72) Inventor: Ben Wei Chen, Fountain Valley, CA (US)

(73) Assignee: Kingston Digital, Inc., Fountain Valley, CA (US)

( * ) Notice: Subject to any disclaimer, the term of this patent is extended or adjusted under 35 U.S.C. 154(b) by 765 days.

(21) Appl. No.: 13/909,889

(22) Filed: Jun. 4, 2013

(65) Prior Publication Data

US 2014/0359477 A1  Dec. 4, 2014

(51) Int. Cl.
- *H04L 29/08* (2006.01)
- *H04L 29/06* (2006.01)
- *G06F 3/0488* (2013.01)
- *H04N 21/422* (2011.01)

(52) U.S. Cl.
CPC ........ *H04L 67/1095* (2013.01); *G06F 3/0488* (2013.01); *H04L 67/1078* (2013.01); *H04L 67/125* (2013.01); *H04N 21/4222* (2013.01); *H04L 29/08306* (2013.01); *H04L 63/029* (2013.01)

(58) Field of Classification Search
CPC . H04L 67/1078–67/125; H04L 65/60–65/608; H04L 67/10–67/1095; H04L 63/029; G06F 3/14–3/1454; G06F 3/048–3/04897; H04M 1/72522–1/7253; H04N 21/4104–21/4227; H04N 21/4126–21/42228; H04W 52/241
See application file for complete search history.

(56) References Cited

U.S. PATENT DOCUMENTS

| | | | |
|---|---|---|---|
| 5,408,618 A | 4/1995 | Aho et al. | |
| 6,438,594 B1 | 8/2002 | Bowman-Amuah | |
| 6,563,515 B1 * | 5/2003 | Reynolds | H04N 5/44543 348/E5.105 |
| 6,779,004 B1 | 8/2004 | Zintel | |
| 6,954,790 B2 | 10/2005 | Forslow | |
| 6,978,314 B2 | 12/2005 | Tarr | |

(Continued)

FOREIGN PATENT DOCUMENTS

| | | |
|---|---|---|
| GB | 2341523 | 3/2000 |
| WO | WO2011133908 | 10/2011 |

OTHER PUBLICATIONS

Filename "Sep. 2012 WiFi-Miracast brochure.pdf" Miracast-paper: "Wi-Fi Certified Miracast™: Extending the Wi-Fi experience to seamless video display" published by Wi-Fi Alliance on Sep. 19, 2012.*

(Continued)

*Primary Examiner* — Wing F Chan
*Assistant Examiner* — Raji Krishnan
(74) *Attorney, Agent, or Firm* — Brundidge & Stanger, P.C.

(57) ABSTRACT

A universal environment extender is disclosed. The universal environment extender comprises a smart device; and a main control utility running on the smart device. Then the main control utility allows the extender as a receiver to operate in a mode that allows the extender to explore and reverse-explore the source content/applications and to extend the display environment from another smart device as a transmitter.

13 Claims, 13 Drawing Sheets

(56) References Cited

U.S. PATENT DOCUMENTS

| | | | |
|---|---|---|---|
| 6,981,041 | B2 | 12/2005 | Araujo et al. |
| 7,068,680 | B1 | 6/2006 | Kaltenmark et al. |
| 7,120,429 | B2 * | 10/2006 | Minear ............... G06F 21/10 |
| | | | 455/418 |
| 7,219,140 | B2 | 5/2007 | Marl et al. |
| 7,293,077 | B1 | 11/2007 | Teo et al. |
| 7,328,256 | B2 | 2/2008 | Taoyama et al. |
| 7,392,034 | B2 | 6/2008 | Westman et al. |
| 7,408,882 | B2 | 8/2008 | Abdo et al. |
| 7,467,198 | B2 | 12/2008 | Goodman et al. |
| 7,487,230 | B2 | 2/2009 | Gu et al. |
| 7,558,846 | B2 | 7/2009 | Gu et al. |
| 7,562,393 | B2 | 7/2009 | Buddhikot et al. |
| 7,602,756 | B2 | 10/2009 | Gu et al. |
| 7,627,653 | B2 | 12/2009 | Taoyama et al. |
| 7,630,341 | B2 | 12/2009 | Buddhikot et al. |
| 7,636,764 | B1 | 12/2009 | Fein et al. |
| 7,640,340 | B1 | 12/2009 | Stapp et al. |
| 7,640,546 | B2 | 12/2009 | Zarenin et al. |
| 7,647,203 | B1 | 1/2010 | Herz |
| 7,676,690 | B2 | 3/2010 | Bucher et al. |
| 7,788,656 | B2 | 8/2010 | Harper |
| 7,810,148 | B2 | 10/2010 | Bed-Shacher et al. |
| 7,978,714 | B2 | 7/2011 | Rao et al. |
| 8,045,000 | B2 | 10/2011 | Davidson et al. |
| 8,069,217 | B2 | 11/2011 | Lo et al. |
| 8,170,209 | B2 * | 5/2012 | Peng ............... G11B 20/00007 |
| | | | 370/474 |
| 8,300,056 | B2 | 10/2012 | Nugent et al. |
| 8,412,798 | B1 | 4/2013 | Wang |
| 2004/0223469 | A1 | 11/2004 | Bahl et al. |
| 2005/0041736 | A1 * | 2/2005 | Butler-Smith ....... H04N 13/004 |
| | | | 375/240.01 |
| 2005/0286476 | A1 | 12/2005 | Crosswy et al. |
| 2006/0271968 | A1 * | 11/2006 | Zellner ............... H04N 5/4403 |
| | | | 725/81 |
| 2006/0291434 | A1 | 12/2006 | Gu et al. |
| 2007/0165579 | A1 | 7/2007 | Delibie et al. |
| 2007/0294368 | A1 | 12/2007 | Bomgaars et al. |
| 2008/0016491 | A1 | 1/2008 | Doepke |
| 2008/0019333 | A1 | 1/2008 | Kharia et al. |
| 2008/0162698 | A1 | 7/2008 | Hopen et al. |
| 2008/0201751 | A1 | 8/2008 | Ahmed et al. |
| 2008/0301794 | A1 | 12/2008 | Lee |
| 2009/0019492 | A1 | 1/2009 | Grasset |
| 2009/0106394 | A1 | 4/2009 | Lin et al. |
| 2009/0129301 | A1 | 5/2009 | Belimpasakis |
| 2009/0303973 | A1 | 12/2009 | Patil |
| 2010/0036955 | A1 | 2/2010 | Hopen et al. |
| 2010/0188987 | A1 * | 7/2010 | Azimi ............... H04W 12/06 |
| | | | 370/252 |
| 2011/0107379 | A1 | 5/2011 | Lejoie et al. |
| 2011/0145418 | A1 | 6/2011 | Pratt et al. |
| 2011/0145821 | A1 | 6/2011 | Philipson et al. |
| 2012/0030584 | A1 * | 2/2012 | Bian ............... G06F 9/4443 |
| | | | 715/746 |
| 2012/0042102 | A1 | 2/2012 | Chung et al. |
| 2012/0042275 | A1 * | 2/2012 | Neerudu ............... G06F 3/1454 |
| | | | 715/781 |
| 2012/0081382 | A1 | 4/2012 | Lindahl et al. |
| 2012/0084798 | A1 | 4/2012 | Reeves et al. |
| 2012/0164961 | A1 * | 6/2012 | Gao ............... H04W 52/241 |
| | | | 455/127.1 |
| 2012/0236796 | A1 | 9/2012 | Lazaridis et al. |
| 2012/0307141 | A1 | 12/2012 | Millet et al. |
| 2012/0311329 | A1 | 12/2012 | Medina et al. |
| 2013/0024545 | A1 | 1/2013 | Sheppard et al. |
| 2013/0067550 | A1 | 3/2013 | Chen et al. |
| 2013/0150161 | A1 * | 6/2013 | Kruglick ............... A63F 13/355 |
| | | | 463/34 |
| 2013/0177891 | A1 * | 7/2013 | Hammerschmidt ..... G09B 5/06 |
| | | | 434/309 |
| 2013/0231146 | A1 | 9/2013 | Mathias et al. |
| 2014/0141721 | A1 * | 5/2014 | Kim ............... H04M 1/7253 |
| | | | 455/41.2 |
| 2014/0306865 | A1 * | 10/2014 | Pan ............... G06F 3/1423 |
| | | | 345/2.1 |
| 2014/0359477 | A1 * | 12/2014 | Chen ............... H04L 67/1095 |
| | | | 715/748 |
| 2015/0327313 | A1 * | 11/2015 | Kim ............... H04W 80/10 |
| | | | 370/329 |

OTHER PUBLICATIONS

Filename: "WiFi Miracast Demo video—Screenshots and Transcript.pdf" Screenshots and Transcripts of "Wi-Fi Certified Miracast™ Demo at 2013 CES" video https://www.youtube.com/watch?v=cYagdOp9y7E published by Wi-Fi Alliance on Jan. 9, 2013.*

Filename: "Jul. 2011 Samsung Remote App.pdf" "Samsung App Profile: Remote App" published published online on Jul. 30, 2011.*

Filename: "Mar. 2013 panasonic-my-home-screen-smart-tv.pdf" "Panasonic My Home Screen Smart TV Interface" published online on Mar. 6, 2013.*

Filename: "Jul. 2012 samsung-tv-remote-app" "Samsung TV Remote app not working for some 2012" online article published on Jul. 18, 2012.*

"Panasonic VIERA Connect Web Platform (2012)" online article by Adrienne Maxwell published on Jul. 31, 2012 at https://hometheaterreview.com/panasonic-viera-connect-web-platform-2012/.*

"Viera Remote App Basic—screenshots", includes screenshots of https://www.youtube.com/watch?v=QZ2hCyOhZmc "VIERA remote App Version 2.0—Basic Operation" published on May 30, 2012.*

"Panasonic App Viera 2.0" an online document published on Mar. 21, 2012 at http://imultiscreen.com/panasonic-app-viera-2-0-feb-2012/ which is a transcript of https://www.youtube.com/watch?v=j9kgEtNMTZ4.*

Google Search—panasonic viera tv remote app.*

Google Search—viera remote app 2.0.*

Google Search—viera tv remote app.*

Rue Liu, "Iomega Home Media Hard Drive Cloud Edition Review—SlashGear", Jun. 2011, SlashGear, http://www.slashgear.com/iomega-home-media-hard-drive-cloud-edition-review-14156840/.

Ellison, Craig (Mar. 29, 2011) "Iomega Home Media Network Hard Drive—Cloud Edition Reviewed" SmallCloudBuilder.com http://www.smallcloudbuilder.com/storage/reviews/311-iomega-home-media-network-hard-drive-cloud-edition-reviewed.

Malik, Om (May 22, 2009) "How Pogoplug Works" gigaom.com http://gigaom.com/2009/05/22/how-pogoplug-works/.

MlDonkey (Oct. 5, 2010) "WhatFirewallPortsToOpen" mldonkey.sourceforge.net http://mldonkey.sourceforge.net/WhatFirewallPortsToOpen.

McDowell, Guy (Oct. 10, 2009) "How does a Router Work? [Technology Explained]"makeuseof.com http://www.makeuseof.com/tag/technology-explained-how-does-a-router-work/.

Use Yahoo Messenger for a Video or Audio Conference, Mar. 2005, http://education.ucf.edu/techfac/docs/videochattutorial.pdf.

GB Examination Report from Application No.: GB1312300.5 dated May 27, 2016, 2 pages.

* cited by examiner

UNIVERSAL ENVIRONMENT EXTENDER

CROSS-REFERENCE TO RELATED APPLICATION

This application is related to U.S. patent application Ser. No. 13/229,285, filed Sep. 9, 2011, entitled "PRIVATE CLOUD SERVER AND CLIENT ARCHITECTURE WITHOUT UTILIZING A ROUTING SERVER," and U.S. patent application Ser. No. 12/912,614, filed Oct. 26, 2010, entitled "DUAL-MODE WIRELESS NETWORKED DEVICE INTERFACE AND AUTOMATIC CONFIGURATION THEREOF," all of which are incorporated herein by reference in there entireties.

FIELD OF THE INVENTION

The present invention is related to smart devices and more specifically to a system and method for extending such devices.

BACKGROUND

As smart devices such as smart phones and tablets become ubiquitous and prevalent, it becomes desirable that the user interface and experience of such device can be extended beyond the physical bound of the smart devices. If the smart device serves as one of the senses of the human body, it can act as an environment extender that can greatly extend the physical boundary of the user.

Smart devices come from different vendors and are loaded with different operating systems (OS), such as Android, iOS and Linux. It becomes a big challenge for the extender to be able to work with different smart devices, under different OS and/or environment.

The concept of the environment extender is not new. It has been limitedly realized by Apple TV and Android Miracast. While in Apple TV, the audio and video content of an iPhone or iPad can be mirrored to an Apple TV settop box that is hooked up to a high definition TV (HDTV). The audio and video content are streamed from the smart device, iPhone or iPad, to the HDTV. The Apple TV can also receive selected media file format, such mp4, mp3 or jpeg, from the smart device and play on the HDTV. In this case, Apple TV serves as an environment extender. It can either "mirror" the smart device environment on to the HDTV through Apple TV, or "stream certain content" from the smart device to the HDTV.

In the case of Miracast on Android platform, the smart device environment is "mirrored" to the HDTV through an Android settop box. The Android settop box can also received "certain streamed content" from the smart device and play it on the HDTV.

While both platforms can "mirror" and "stream", it is limited to the smart device, as the transmitter, running under the same OS with the settop box, as the receiver. Furthermore, the file format support is limited. It is usually limited to just mp4, mp3 and jepeg files.

It is usually difficult, if not impossible, to transmit content from one smart device to another receiver that is running under a different OS. Examples are: transmitting from an iDevice to an Android receiver; transmitting from an Android device to an Apple receiver such as an Apple TV.

SUMMARY

A universal environment extender is disclosed. The universal environment extender comprises a smart device; and a main control utility running on the smart device. Then the main control utility allows the extender as a receiver to operate in a mode that allows the extender to explore and reverse-explore the source content/applications and to extend the display environment from another smart device as a transmitter.

DETAILED DESCRIPTION

Figure 1:
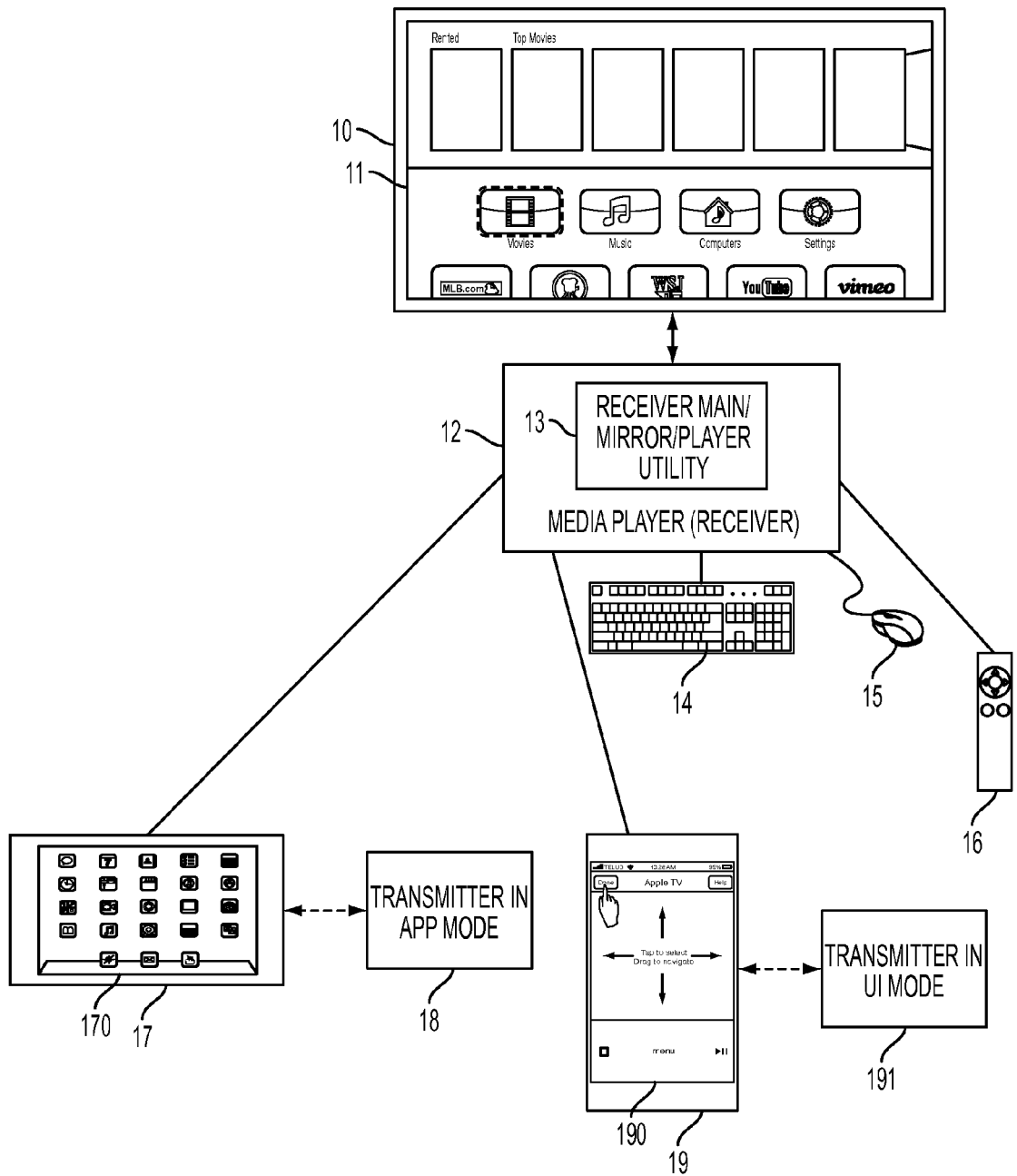
FIG. 1 is a block diagram of a conventional media player with receiver main/mirror/player app.

The present invention is related to smart devices and more specifically to a system and method for extending such devices. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

A system and method in accordance with an embodiment comprises a receiver, a transmitter and a pair of applications (apps) running on both devices. One receiving app is running under the receiver while another transmitter app is running under the target smart device. The receiver is able to interact with any smart device with the transmitter app installed. It is able to mirror any smart device environment and to stream any intended file content to the remote display such as HDTV, smart watch, smart glasses, smart conference room projector, smart settop box, smart car entertainment system, medical console, or smart gadgets.

A system and method in accordance with the present invention will also expand the network interface between the transmitter and the receiver from wireless local area network (WLAN) to wide area network (WAN). By applying principles disclosed for example in U.S. patent application Ser. No. 13/229,285, entitled "PRIVATE CLOUD SERVER AND CLIENT ARCHITECTURE WITHOUT UTILIZING A ROUTING SERVER," assigned to the assignee of the present application, a receiver can be accessed as a private cloud server from anywhere at anytime by the transmitter as a smart device client. The transmitter can also access the receiver as a private cloud server behind the firewall with fixed or dynamic IP addresses. The transmitter as a smart device client requires no outside or third party routing server 1312 in the WAN; requires no additional router setup in the LAN to establish a secure peer-to-peer communication channel with the receiver as a private cloud server. The transmitter as a smart device client can access services or storage from the receiver as a private cloud server.

A universal environment extender is provided that is able to work with the smart devices from different vendors with different OS. It is able to extend the user interface and user experience beyond the physical boundary of the smart device onto a remote environment that is also accessible by the user.

An extender in accordance with an embodiment can be utilized with HDTV, smart watch, smart glasses, smart conference room projector, smart settop box, smart car entertainment system, medical console, or smart gadgets.

The content in general is divided into two categories:
1. Content accessible to the receiver
2. Content accessible to the transmitter, but not to the receiver Traditionally, a transmitter would "push" content through the interface to a receiver. The receiver then decodes the content and play on the local display. This mechanism has been applied by Apple TV as well as Android media player. The problem becomes obvious when the transmitter is able to "explore" and discover other content beyond its local access domain. The content would have to be downloaded or streamed to the transmitter and then send to the receiver. The routing distance from the source of the content to the ultimate display would have been much longer, if not double. It is one of the purposes of this invention to make the streaming of the content more efficient by allowing the receiver to "pull" the content directly from the source, be it on the transmitter or on the network resources where the transmitter has access to.

For those content that are accessible to the receiver, the receiver will build a content explorer. The content is then explored and selected by the transmitter. The content is then "pulled" by the receiver from the original source domain, Only for those content that are accessible to the transmitter, but not to the receiver, the receiver will build a reverse content explorer, based on the information from the transmitter. The content is then explored and selected by the transmitter. The content is then "pulled" by the receiver through transmitter from the original source domain.

As shown in FIG. 1, a conventional media player 12 has the main/mirror/player app 13 running. The media player 12 may be connected by a keyboard 14, a mouse 15, and/or a remote control stick 16. It also may be wirelessly connected by a smart phone 19, or a tablet 17. The smart phone 19 and the tablet 17 are collectively caller smart devices. The smart devices have app running in UI (user interface) mode 191, or in content mode 18. Connected to the media player (receiver) 12, the receiver display device 10 can be a HDTV, projector, automobile panel, or a watch panel. The display panel 11 shows the viewable content from the result of the receiver main/mirror/player app. The transmitter 17, 19 is able to "push" content to the receiver 12 in mirror mode, which displays the exact mirror of the content on receiver display panel 11 as shown on the transmitter display panel 170 or 190.

The transmitter 17, 19 is also able to run in UI mode 191 in order to control the receiver main/mirror/player utility 13 to do configuration and system function. The transmitter 17, 19 is further able to run in app mode 18 to "push" the selected content, video, audio and/or photo, to the receiver display panel 11 or audio function (not shown) connected to the receiver 12.

Throughout the rest of this description, the terms "display" or "display panel" apply to both video and audio functions on the display devices. The term "content" refers generally to video, audio, photos, and document files. The term "app" refers generally to application installed on the transmitter and receiver. The term "stream" refers generally to "play" and/or "read/write" the content from/to the source. The term "wireless" refers to any wireless network including WiFi local area network (WLAN) or wide area network (WAN). The term "explorer" refers to storage, file or content explorer. In some situation, it refers to app explorer. The term "storage" refers to accessible storage including local or network storage.

As can be seen from FIG. 1, it is cumbersome to require a keyboard 14, a mouse 15, and/or a remote control stick 16 to conduct configuration or operation onto the functions of the receiver 12. It would be beneficial to do away with the keyboard, mouse and/or remote control stick and yet be able to conduct configuration or operation onto the functions of the receiver 12. By eliminating this user interface devices it saves costs and will also provide a more elegant solution for the user.

In a wireless networking environment, two smart devices behaving as a transmitter and a receiver can work in two different modes. One is peer-to-peer mode, while another is joining the wireless access point (AP) mode. In a self-contained environment, the peer-to-peer mode is sufficient with one serving as a router while many clients may connect to the router. But the "joining the wireless access point" mode is more common at work or at home for the smart devices.

It is not difficult for two smart devices, one as a transmitter and another as a receiver, to build a peer-to-peer network. Once the peer-to-peer network is established, the transmitter is able to configure the receiver setting either through a browser or an app. But if another wireless access point exists on the wireless network that serves as a main router, it is beneficial to have both the transmitter and the receiver to join this AP network such that both can access to the resources on the network. The resources available include network storage, Internet capability, network printing, network audio and others.

It becomes difficult and not obvious for the transmitter to configure the newly discovered receiver through the peer-to-peer network and to discover the available access point (AP) on the open wireless environment. It is a second objective to allow the transmitter to be able to discover the receiver and the wireless access point separately and be able to configure the receiver as well as to connect the receiver to the access point all through the transmitter user interface panel on the transmitter, without resorting to any external means like mouse, keyboard or a remote control stick.

The realization of this objective is described in U.S. patent application Ser. No. 12/912,614, entitled "DUAL-MODE WIRELESS NETWORKED DEVICE INTERFACE AND AUTOMATIC CONFIGURATION THEREOF," which is assigned to the assignee of the present application. An autoconfiguration function is provided which through a portable device can associate with one or more portable devices on a downstream wireless network and associate with one or more access points on an upstream wireless network.

When it comes to content, it is divided into two types: playable content and object/link content. The playable content includes video, audio, photo, and document. The document includes Word, Excel, Power Point, PDF, Text and others. The object/link content includes: URL link, app links such as YouTube link, Facebook link and others. In traditional media player, the playable content, limited to video, audio and photo, is "pushed" from the transmitter 17, 19 to the receiver 12. The receiver player utility 13 will decode the playable content and "play" or display on the receiver display panel 11. The object/link is more appropriately referred to as app.

Due to IP and compatibility issues, the transmitter and receiver tend to work in pairs. It implies that the transmitter and the receiver have to run in the same domain of the OS (operating system), such as iOS, Android or Linux.

It is a third objective to eliminate this limitation to allow the transmitter running under any kind of OS to be able to play any kind of content and app on the receiver in all operational modes.

Video, audio and photo are the most obvious streaming applications between the transmitter and receiver. The applications are limited by the traditional receiver to only support these three content formats for streaming. It is a fourth objective to stream Word, text, power point, Excel, PDF and other documentation file formats in addition to the traditional video, audio, photo content.

By "pushing" the content from the transmitter to the receiver, traditional media player has another deficiency in being a middle man when streaming the content from outside the transmitter to the receiver. It would have to "pull" the content from outside the transmitter and then "push" it to the receiver. In terms of efficiency, it wastes the transfer bandwidth and the resources of the transmitter during the streaming process. It is a fifth objective of this invention to implement "pull" mechanism in the receiver. In the above scenario, all the transmitter has to do is to pass the content location information to the receiver. In essence, it allows the receiver to build a reverse content explorer on the contents that the transmitter has the right to access to, including the content on the transmitter as well as those accessible devices residing on the same network with the receiver. Once selected, the content will be "pulled" by the receiver directly, without any resources dedicated from the transmitter.

A sixth objective of the invention is to expand the interface between the transmitter and the receiver from wireless local area network (WLAN) to wide area network (WAN). The realization of this objective is described in patent application: serial no. entitled PRIVATE CLOUD SERVER AND CLIENT ARCHITECTURE WITHOUT UTILIZING A ROUTING SERVER Ser. No. 13/229,285. It allows accessing the receiver as a private cloud server from anywhere at anytime by the transmitter as a smart device client. The transmitter can also access the receiver as a private cloud server behind the firewall with fixed or dynamic IP addresses. The transmitter as a smart device client requires no outside or third party routing server 1312 in the WAN; requires no additional router setup in the LAN to establish a secure peer-to-peer communication channel with the receiver as a private cloud server. The transmitter as a smart device client can access services or storage from the receiver as a private cloud server.

Figure 2:
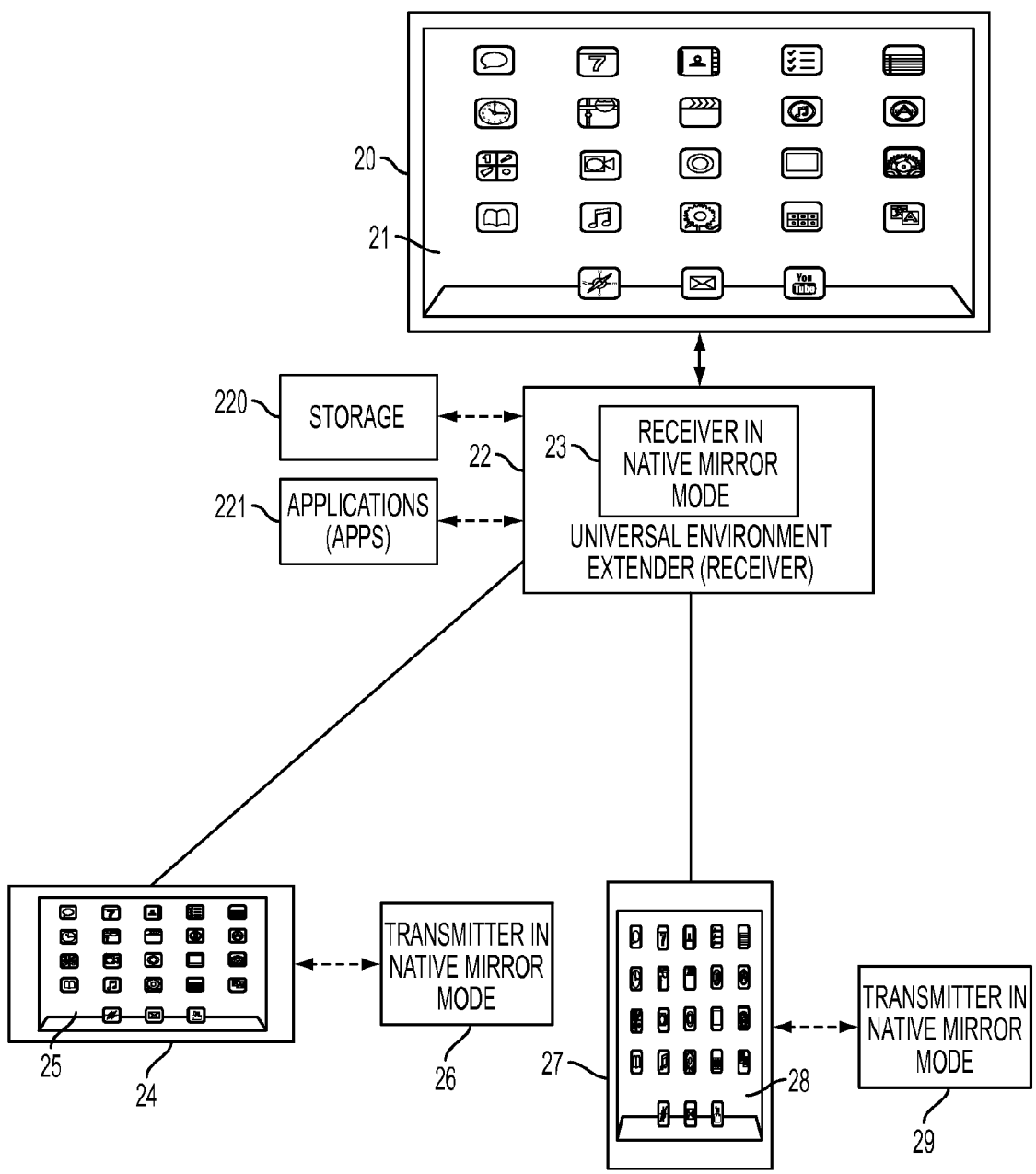
FIG. 2 is a diagram of a universal environment extender in native mirror mode.
Figure 9:
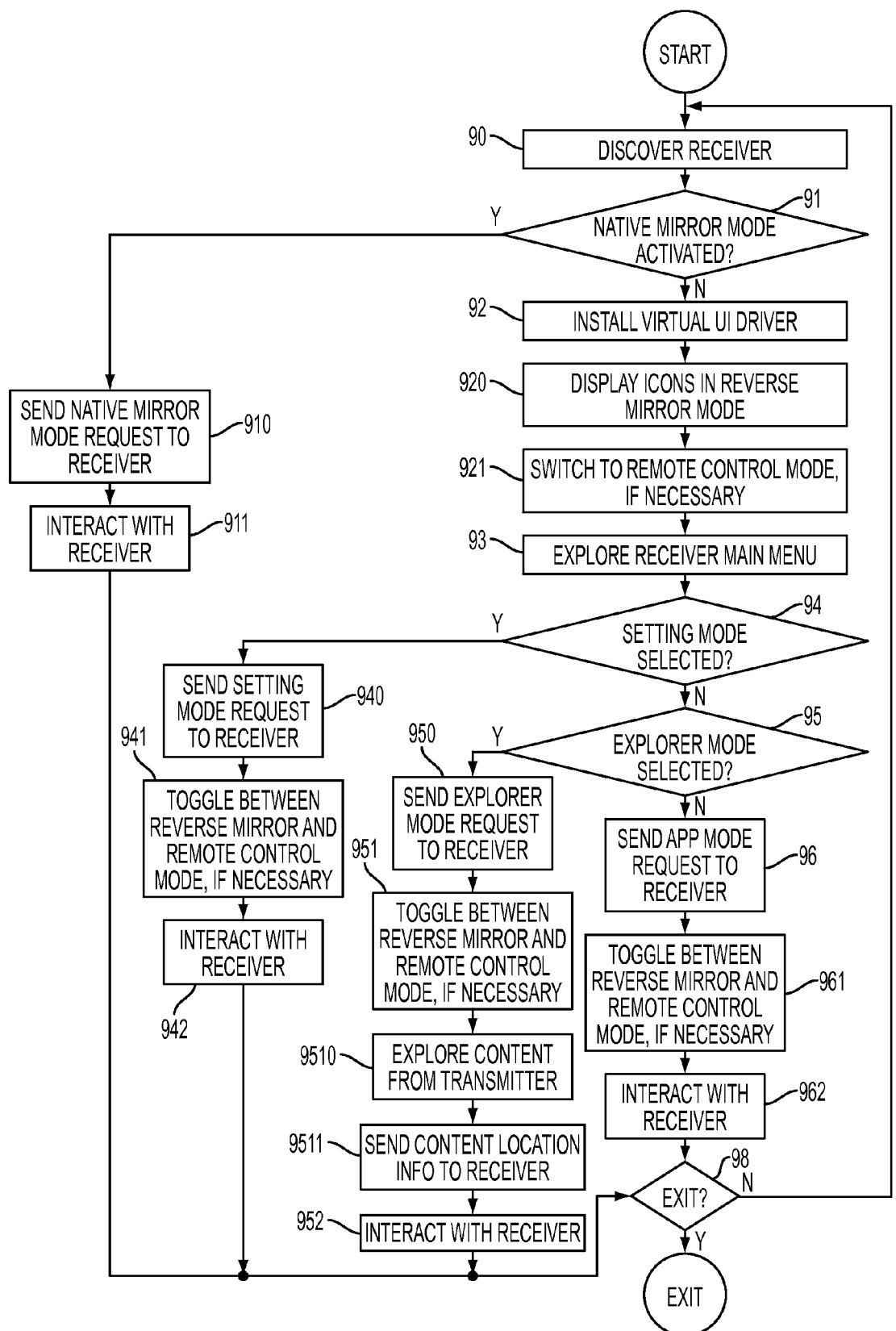
FIG. 9 is a flow chart of the operation of transmitter main control utility.
Figure 10:
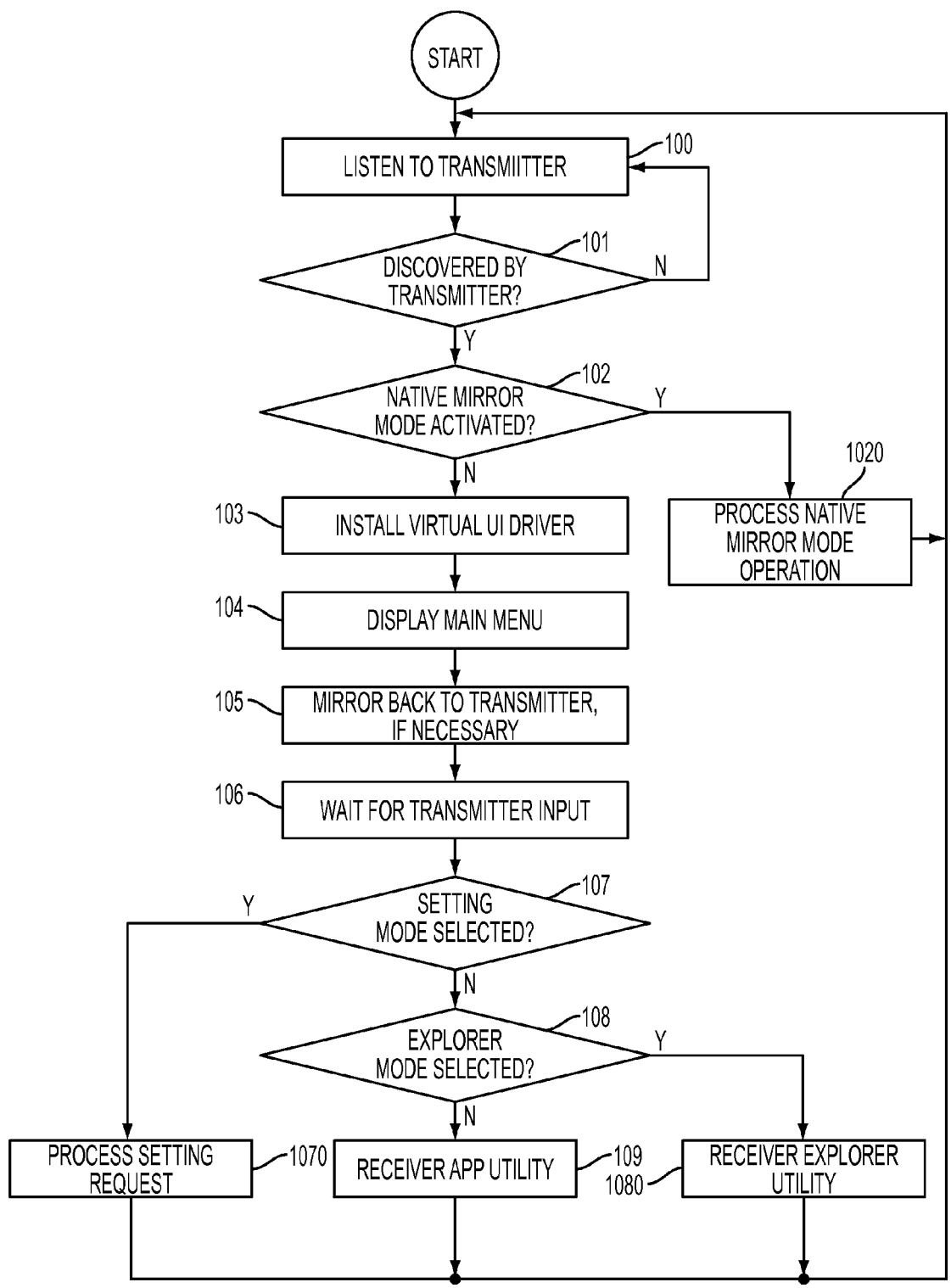
FIG. 10 is a flow chart of the operation of receiver main control utility.

As shown in FIG. 2, a transmitter 24, 27 has a main control utility as shown in FIG. 9, while a receiver 22 has a corresponding main control utility 23 as shown in FIG. 10. In the transmitter main control utility, the transmitter 24, 27 first attempts to discover the receiver 90. Once the receiver 22 is discovered, it checks if the native mirror mode is activated 91. If so, the transmitter 24, 27 sends native mirror mode request to the receiver 910. It starts interacting with the receiver 911. As shown in FIG. 2, the transmitter 24, 27 stays in native mirror mode 26, 29. Its display panel 25, 28 is mirrored on the receiver display panel 21, with the universal environment extender 22 as the receiver running under native mirror mode 23. The display content 21 is displayed and mirrored on the receiver display device 20. The receiver 22 has access to the storage 220 as well as applications 221. The storage includes the local storage and the network accessible storage on the network.

Figure 3:
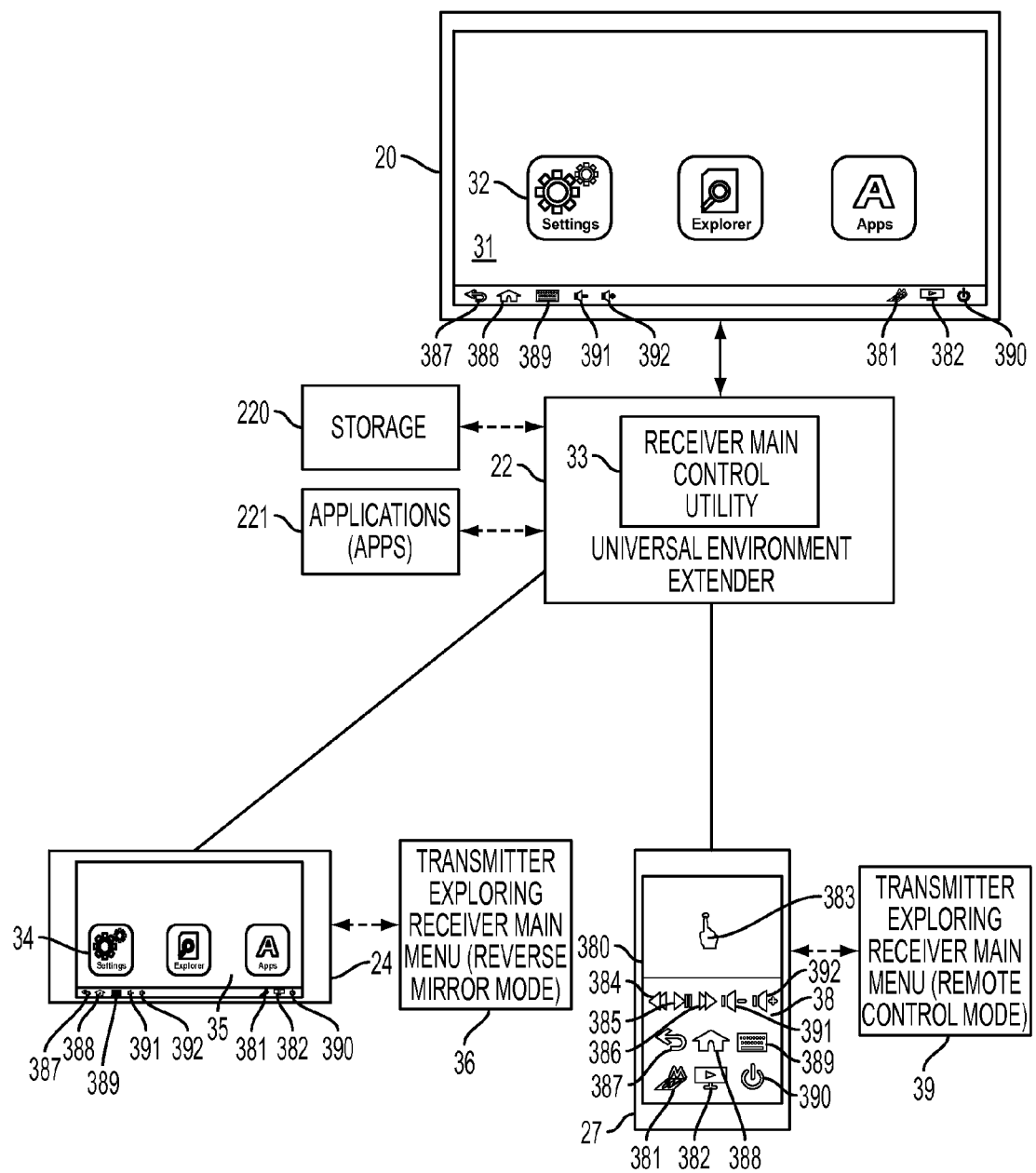
FIG. 3 is a diagram of the universal environment extender when exploring a receiver main menu.

As shown in FIG. 3 and FIG. 9, if the native mirror mode is not activated, the transmitter 24, 27 will install the virtual UI driver 92 which allows it to communicate with the receiver 22. The transmitter 24 will have icons displayed on its reverse mirror panel 36, and runs in reverse mirror mode 920 to control the receiver 22. In reverse mirror mode, finger can move freely in display panel area 35. In the panel 35, several icons are displayed and can be selected, including "volume down" 391, "volume up" 391, "back to last" 387, "home" 388, "soft keyboard" 389, "reverse mirror/toggle" 381, "choose display" 382 and "shut down" 390. The transmitter 27 will have icons displayed on its remote control panel 38, and runs in remote control mode 921 to control the receiver 22. In remote control mode, finger mouse 383 can move freely in mouse pad area 380. In remote control panel 38, several icons are displayed and can be selected, including "search left" 384, "play/pause" 385, "search right" 389, "volume down" 391, "volume up" 391, "back to last" 387, "home" 388, "soft keyboard" 389, "reverse mirror/toggle" 381, "choose display" 382 and "shut down" 390.

The transmitter 24 in reverse mirror mode 36 can toggle to remote control mode 39 in transmitter 27 at any time, if necessary 921, by selecting "reverse mirror/toggle" icon 381. The unit can safely be shut down by selecting icon "shut down" 390. The icons "search left" 384, "play/pause" 385, "search right" 386, once selected, are used mainly by video, audio and photos content explorer and player. The icons "volume down" 391 and "volume up" 392 are for speaker volume control on the receiver 22, once selected. The icon "back to last" 387 is selected to go back to last action. The icon "choose display" 382 is selected to choose which receiver 22 to actively play the content in the storage 220 from the transmitter 24, 27. The playable display panel includes the transmitter's own local display 35, 38, as well as any discoverable receiver 22 on the network.

Once the reverse mirror/toggle icon 381 is selected in the remote control mode 39, the transmitter 27 is toggled to reverse mirror mode 36. Its display panel 35 will mirror whatever is displayed on the receiver display panel 31. Some of the icons from the transmitter 27 remote control panel 38 are also shown on the bottom row of the receiver display panel 31 for control in the reverse mirror mode 36. Examples are: "volume down" 391, "volume up" 391, "back to last" 387, "home" 388, "soft keyboard" 389, "reverse mirror/toggle" 381, "choose display" 382 and "shut down" 390. While in reverse mirror mode 36, the transmitter 24 can also toggle to remote control mode 39 at any time, if necessary, by selecting "reverse mirror/toggle" icon 381.

The "choose display" icon 382 and "reverse mirror/toggle" icon 381 combine to designate which display is active during the operation. The "choose display" icon 382 selects the main active display panel. When "choose display" icon 382 selects the transmitter, only the transmitter display panel is selected as the main active display. When "choose display" icon 382 selects the receiver while "reverse mirror/toggle" icon 381 is on, the receiver display panel is the main active display while the transmitter display panel is also selected. When "choose display" icon 382 selects the receiver while "reverse mirror/toggle" icon 381 is off, only the receiver display panel is selected.

As shown in FIG. 10, the receiver 22 starts its main control utility 23 & 33. It first listens to the transmitter request 100 and tries to be discovered by the transmitter 101. Once it is discovered, it checks if the native mirror mode has been activated 102? If so, it starts processing the native mirror mode 1020.

If the native mirror mode is not activated, the receiver 22 installs the virtual UI driver 93. It displays the main menu 31, 104. The displayed menu is mirrored back to transmitter 24, 27, if necessary 106, and waits for the transmitter input 105.

As shown in FIG. 3, one of the main control icons 32 is selected on the receiver display panel 31. The same icon 34 is selected on the transmitter display panel 35 that is running under reverse mirror mode 36. If the transmitter 27 is running under remote control mode 39, the control icons can be selected on the transmitter display panel 38. The corresponding controls icons are also shown on the bottom row of the receiver display panel 31.

As shown in FIG. 3 and FIG. 9, the transmitter 24, 27 starts exploring receiver main menu 36, 39, 93. If the setting mode is selected, the transmitter 24, 27 sends request to the receiver 940. It can toggle between the reverse mirror mode 36 and remote control mode 39, by selecting the reverse mirror/toggle icon 381 in either mode 941. The transmitter 24, 27 starts interacting with the receiver 942. The receiver 22 starts processing the request 1070 in the receiver main control utility 33. The interaction between the transmitter 24, 27 and the receiver 22 is shown as in FIG. 4.

Figure 4:
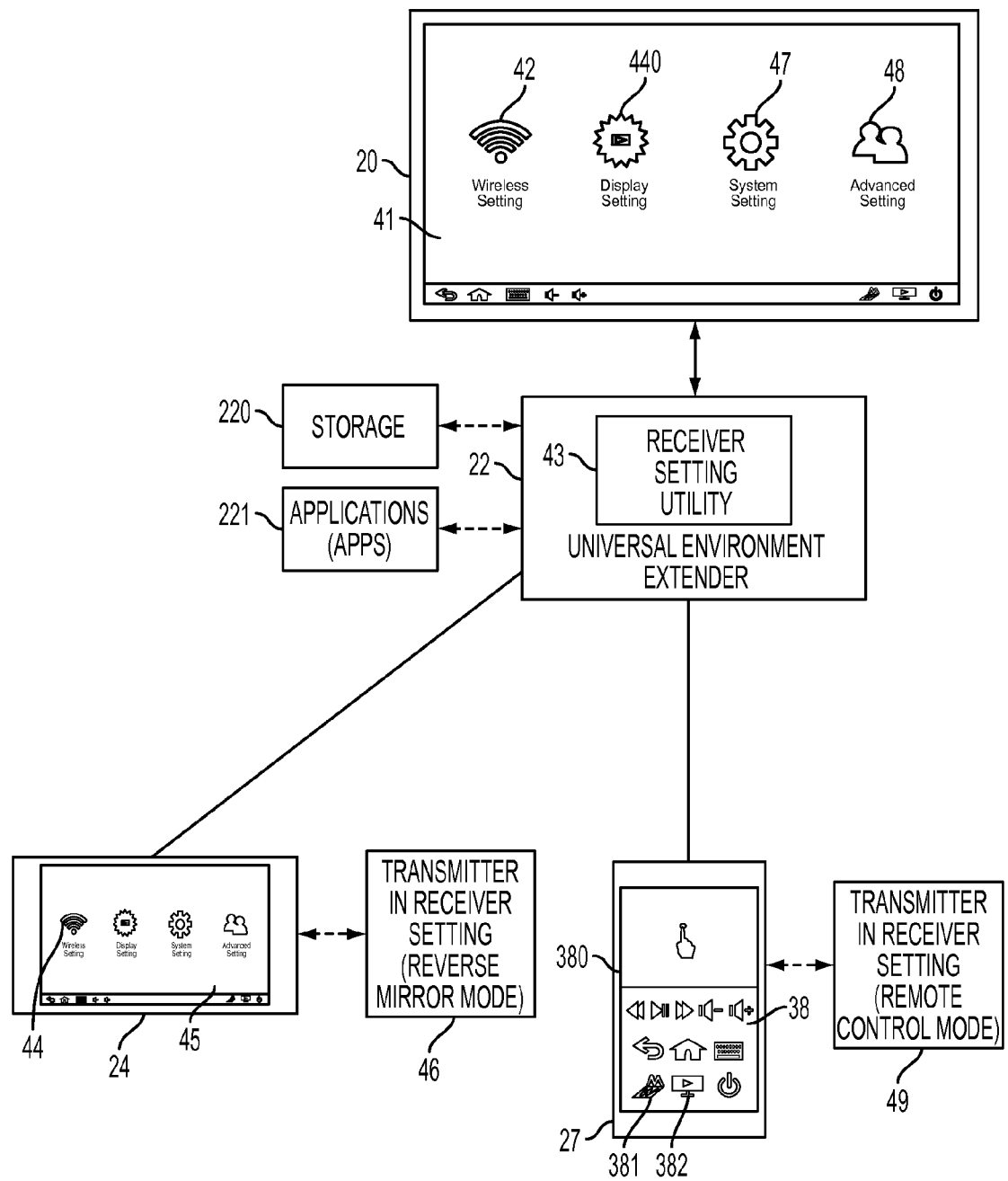
FIG. 4 is a diagram of the universal environment extender when in a setting mode.

As shown in FIG. 4, more setting icons are available, including wireless setting 42, display setting 440, system setting 47 and advanced setting 48. The wireless setting 42 is for receiver wireless attributes including ID, password, and channel in addition to the available wireless access point (AP) information. The corresponding receiver setting utility 43 and transmitter setting utility 46, 49, allow transmitter 24, 27 to configure (not shown) the receiver 22 to join another wireless network access point (AP) while on a peer-to-peer wireless network with the receiver 22.

The display setting 440 is for receiver 22 and receiver display device 20. The system setting 47 is for the system setting of receiver 22, including system information and firmware upgrade. The advanced setting 48 covers the rest of the setting aspects of the receiver 22 that is more for expert mode setting.

As shown in FIG. 4, one of the setting icons 42 is selected on the receiver display panel 41. The same icon 44 is selected on the transmitter display panel 45 that is running under reverse mirror mode 46. If the transmitter 27 is running under remote control mode 49, the control icons can be selected on the transmitter display panel 38. The corresponding controls icons are also shown on the bottom row of the receiver display panel 41.

Figure 5:
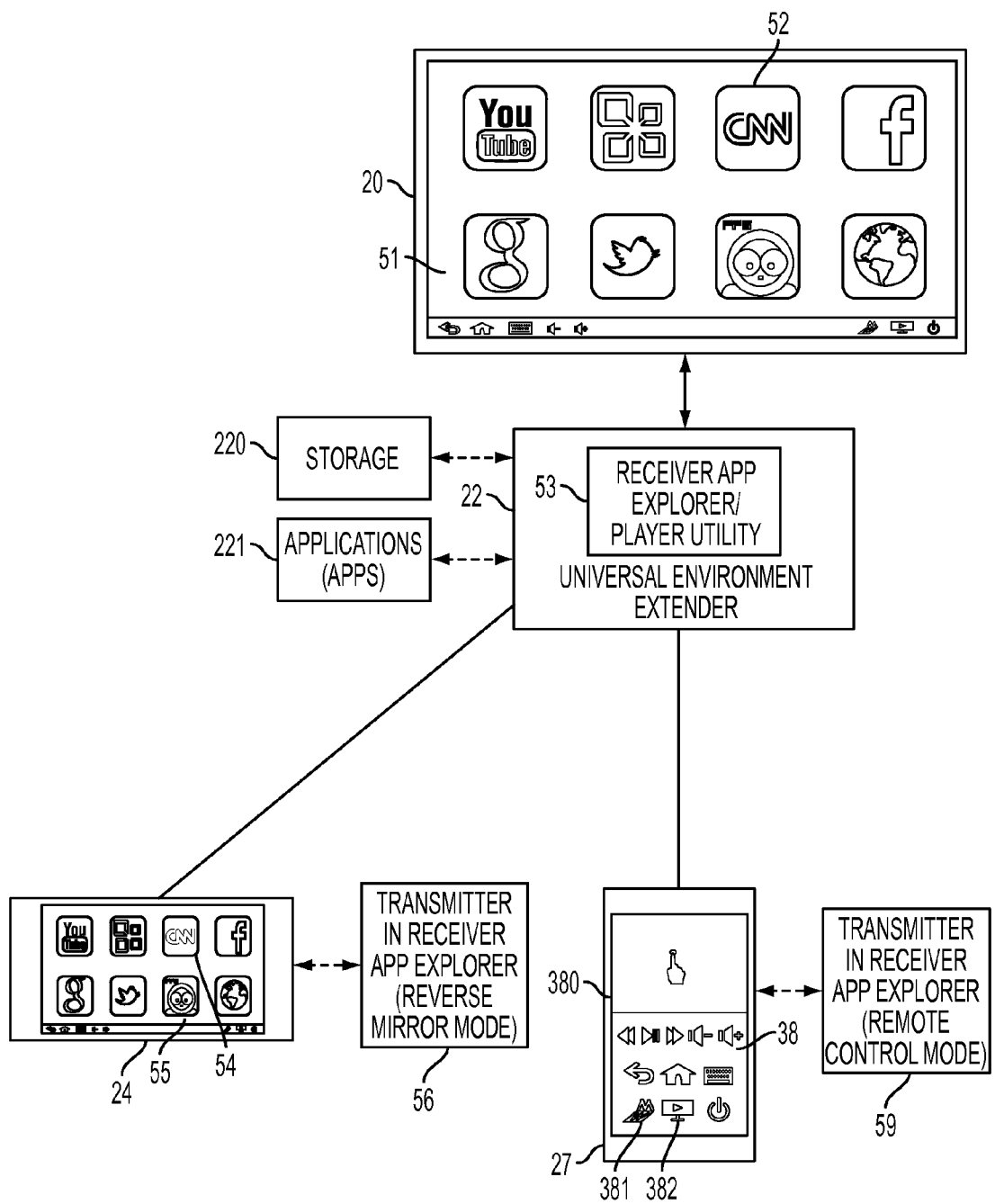
FIG. 5 is a diagram of the universal environment extender when in a receiver app explorer mode.

If the app mode is selected, as shown in FIG. 5, the transmitter 24, 27 sends request to the receiver 96. It can toggle between the reverse mirror mode 36 and remote control mode 39, by selecting the reverse mirror/toggle icon 381 in either mode 961. The transmitter 24, 27 starts interacting with the receiver 962. On the receiver side, it starts the receiver app explorer/player utility 53, 109 as in FIG. 5 and FIG. 10.

Figure 6:
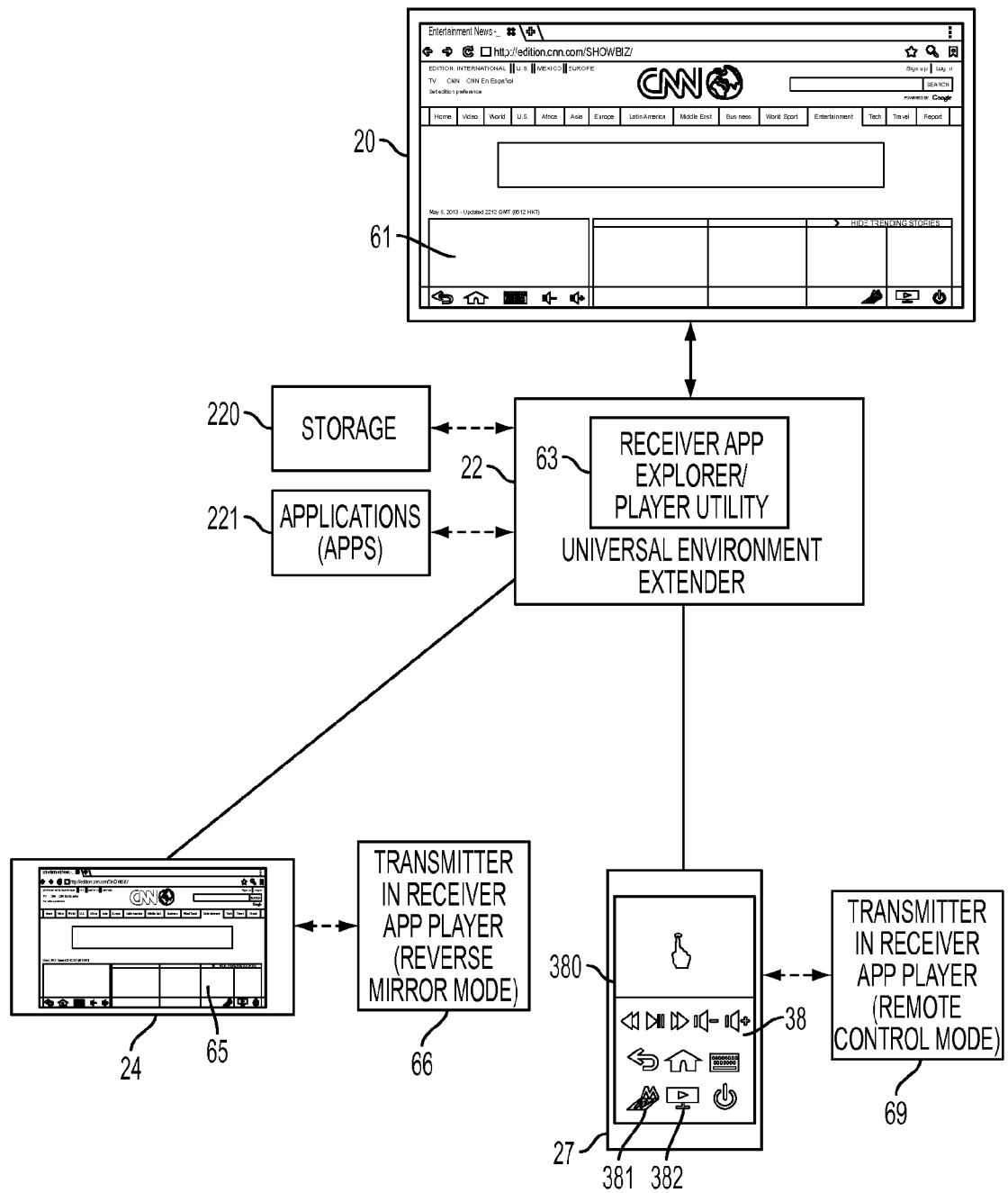
FIG. 6 is a diagram of the universal environment extender when in a receiver app player mode.
Figure 11:
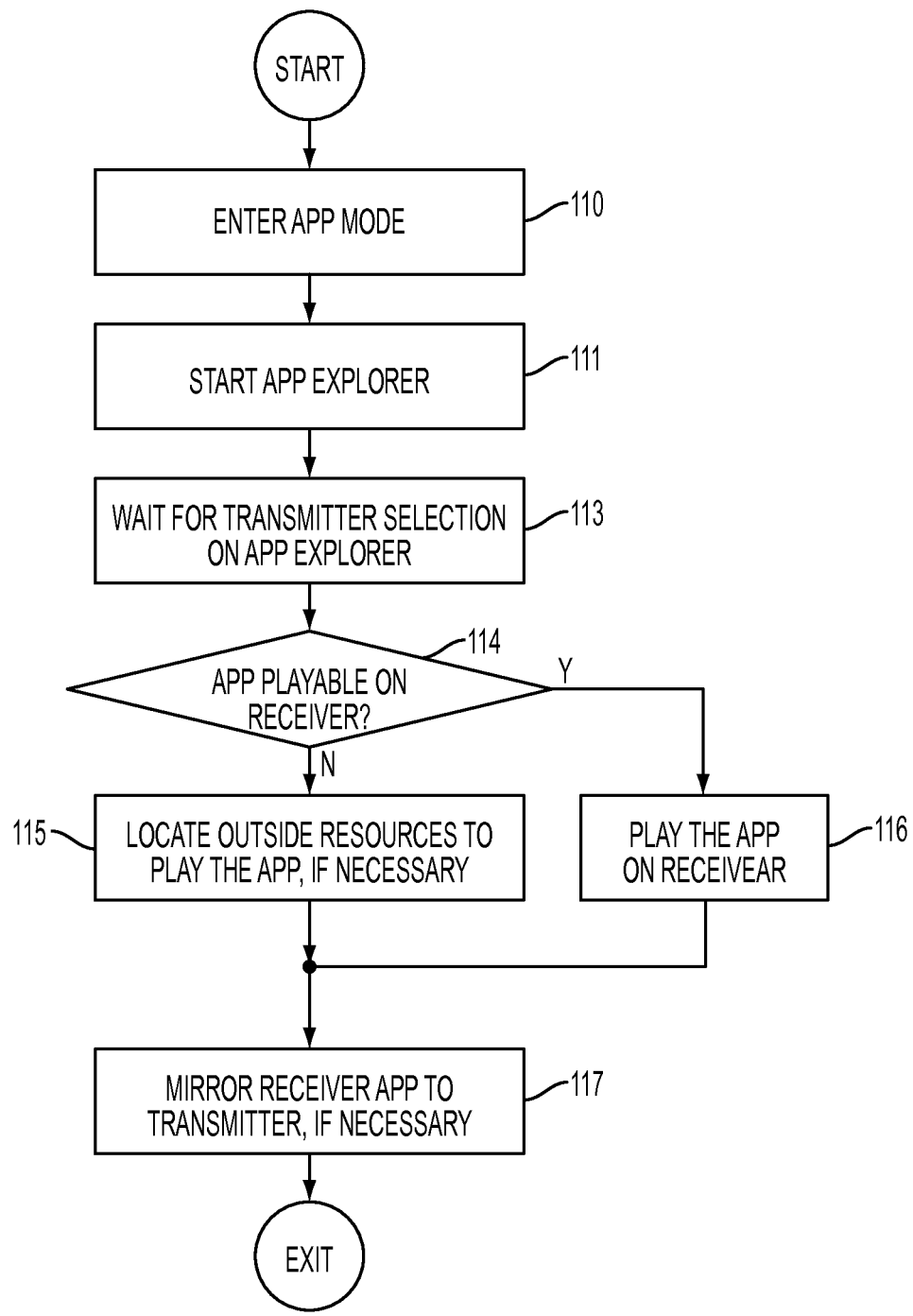
FIG. 11 is a flow chart of the operation of receiver app explorer/player utility.

As shown in FIG. 5, FIG. 6 & FIG. 11, the receiver 22 starts the app explorer/player utility 53 & 63 and app explorer 111. It waits for the transmitter selection 113 to determine if the app from applications 221 is playable on the receiver 114? If it is playable, the app from applications 221 is run on the receiver 116. If it is not playable, the receiver 22 will locate outside resources to play the app, if necessary 115.

As shown in FIG. 5, one of the app icons 52 from applications 221 is selected on the receiver display panel 51. The same icon 54 is selected on the transmitter display panel 55 that is running under reverse mirror mode 56. If the transmitter 27 is running under remote control mode 59, the control icons can be selected on the transmitter display panel 38. The corresponding controls icons are also shown on the bottom row of the receiver display panel 51.

As shown in FIG. 5 & FIG. 6, the selected app 52 from applications 221, is played on the receiver display panel 61 by the receiver app explorer/player utility 53 & 63. The selected app 52 can be reverse mirrored 66 back to the transmitter 24 on its panel 65. In either remote control mode 69, or reverse mirror mode 66, most control icons are available on transmitter display panel 38, 65 or on the bottom row of the receiver display panel 61.

As shown in FIG. 9, if the explorer mode is selected, the transmitter 24, 27 will first send the request to the receiver 950. It can toggle between the reverse mirror mode 36 and remote control mode 39, by selecting the reverse mirror/toggle icon 381 in either mode 951. The transmitter 24, 27 then explores the local content 9510 in the storage 220 and sends the content location to the receiver 9511 and starts interacting with the receiver 962. On the receiver side, as shown in FIG. 10, if the explorer mode is selected, it starts receiver explorer utility 1080.

Figure 7:
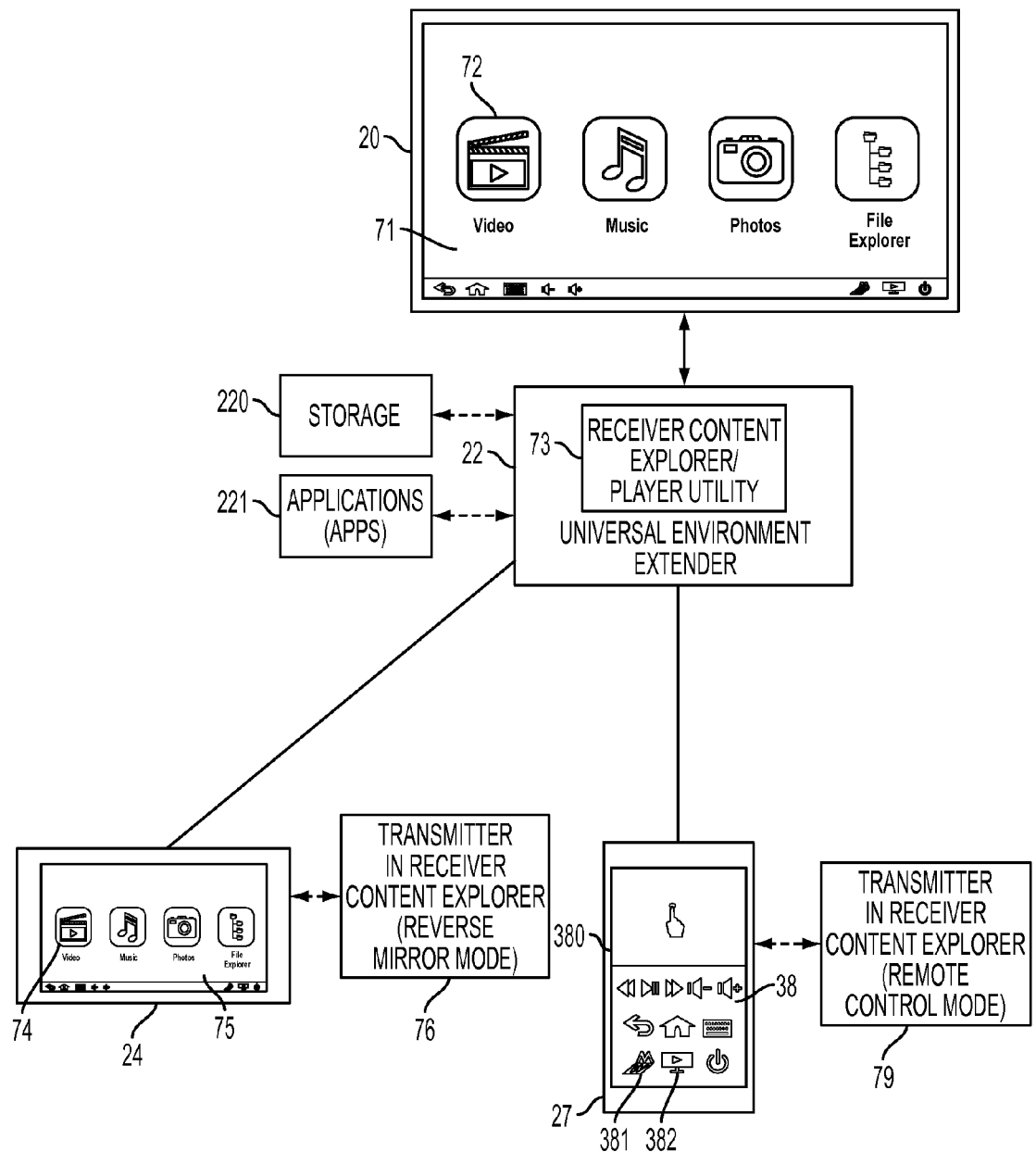
FIG. 7 is a diagram of the universal environment extender when in a receiver content explorer mode.

As shown in FIG. 7, one of the content type icons 72 is selected on the receiver display panel 71. The same icon 74 is selected on the transmitter display panel 75 that is running under reverse mirror mode 76. If the transmitter 27 is running under remote control mode 79, the control icons can be selected on the transmitter display panel 38. The corresponding controls icons are also shown on the bottom row of the receiver display panel 71.

Figure 8:
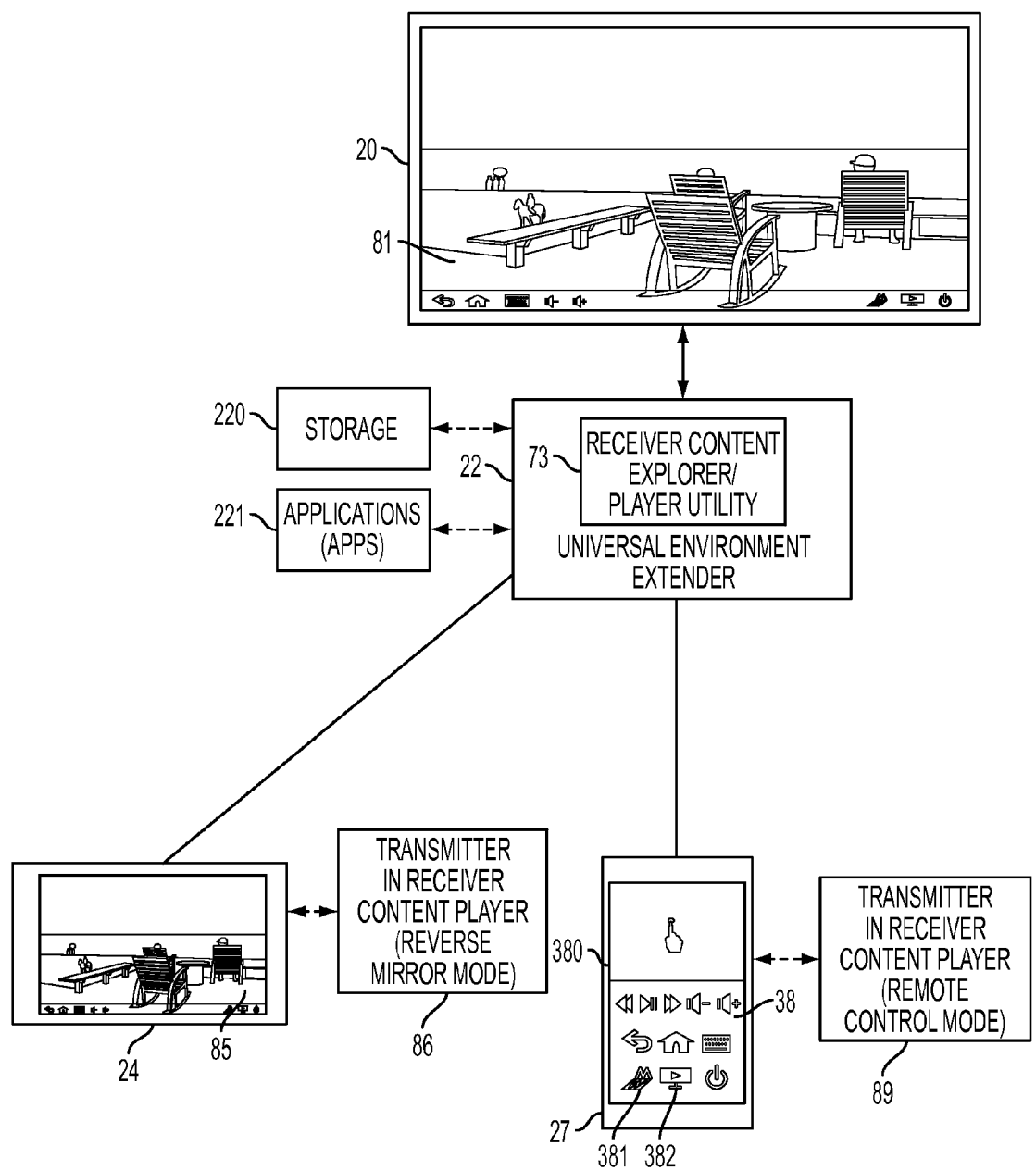
FIG. 8 is a diagram of the universal environment extender when in a receiver content player mode.

As shown in FIG. 7 and FIG. 8, the selected content type 72, will further be explored (not shown) by the receiver content explorer/player utility 73. The selected content in the storage 220 is eventually played on the receiver display panel 81 by the receiver app explorer/player utility 73. The played content in the storage 220 can be reverse mirrored 86 back to the transmitter 24 on its display panel 85. In either remote control mode 89, or reverse mirror mode 86, most control icons are available on transmitter display panel 38, 85 or on the bottom row of the receiver display panel 81.

The "choose display" icon 382 and "reverse mirror/toggle" icon 381 combine to designate which display is active during the operation. When "choose display" icon 382 selects the transmitter, only the transmitter display panel is selected. When "choose display" icon 382 selects the receiver while "reverse mirror/toggle" icon 381 is on, the receiver display panel as well as the transmitter display panel are selected. When "choose display" icon 382 selects the receiver while "reverse mirror/toggle" icon 381 is off, only the receiver display panel is selected.

Figure 12:
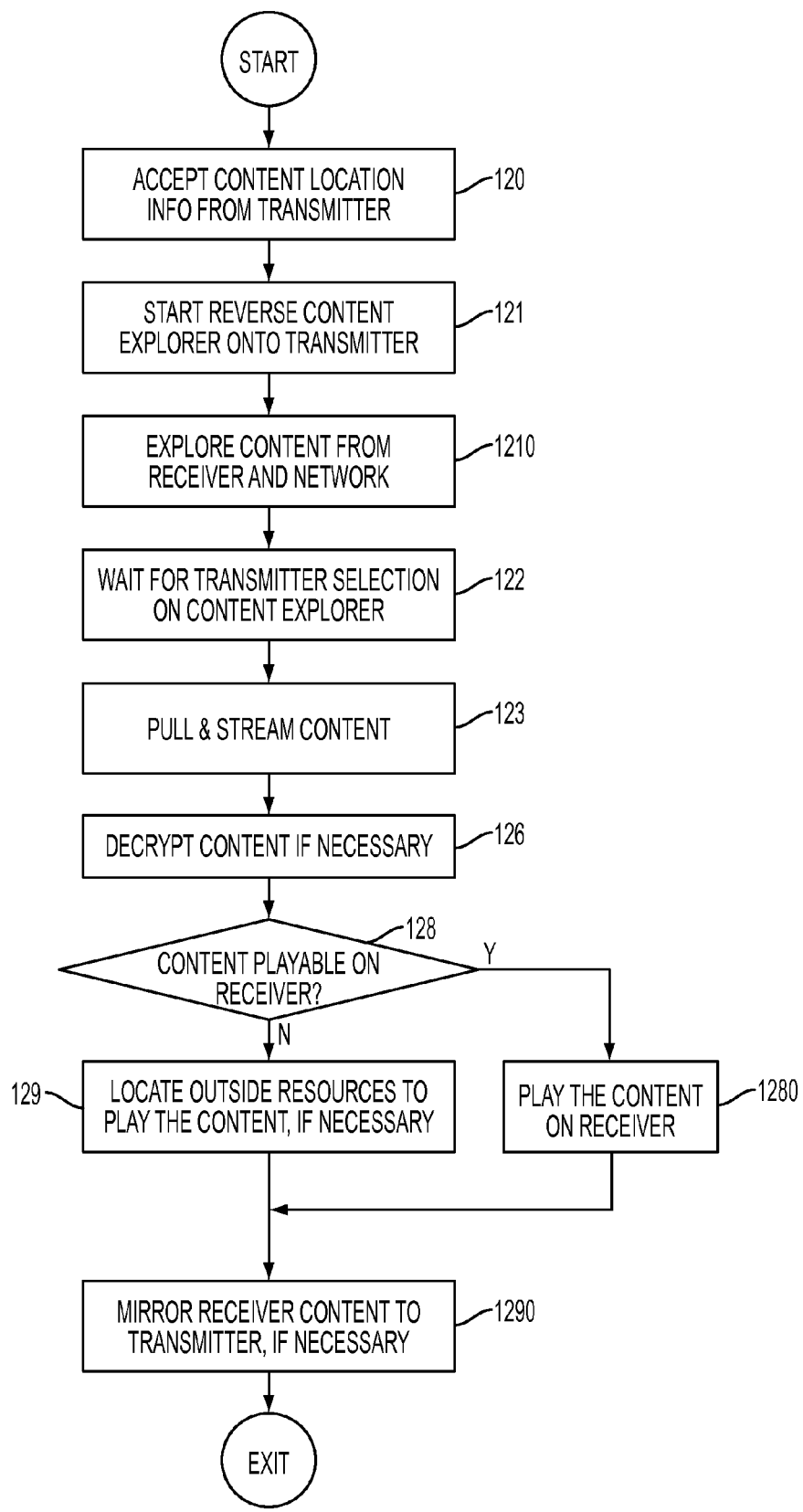
FIG. 12 is a flow chart of the operation of receiver content explorer/player utility.

As shown in FIG. 7 and FIG. 12, the receiver content explorer/player utility 73 accepts content location info from the transmitter 120. It then starts reverse content explorer onto the transmitter 121. It will also explore the content in the storage 220 from the receiver 22 and its accessible network domain 1210. It waits for the selection from the transmitter 122. The content in the storage 220 is "pulled" from the source and streamed to the receiver 123. The receiver 22 will decrypt the content in the storage 220, if necessary 126. It checks if the content is playable on the receiver 128? If so, the content is played 1280. If not, the receiver 22 will locate outside resources to play the content, if necessary 129.

Figure 13:
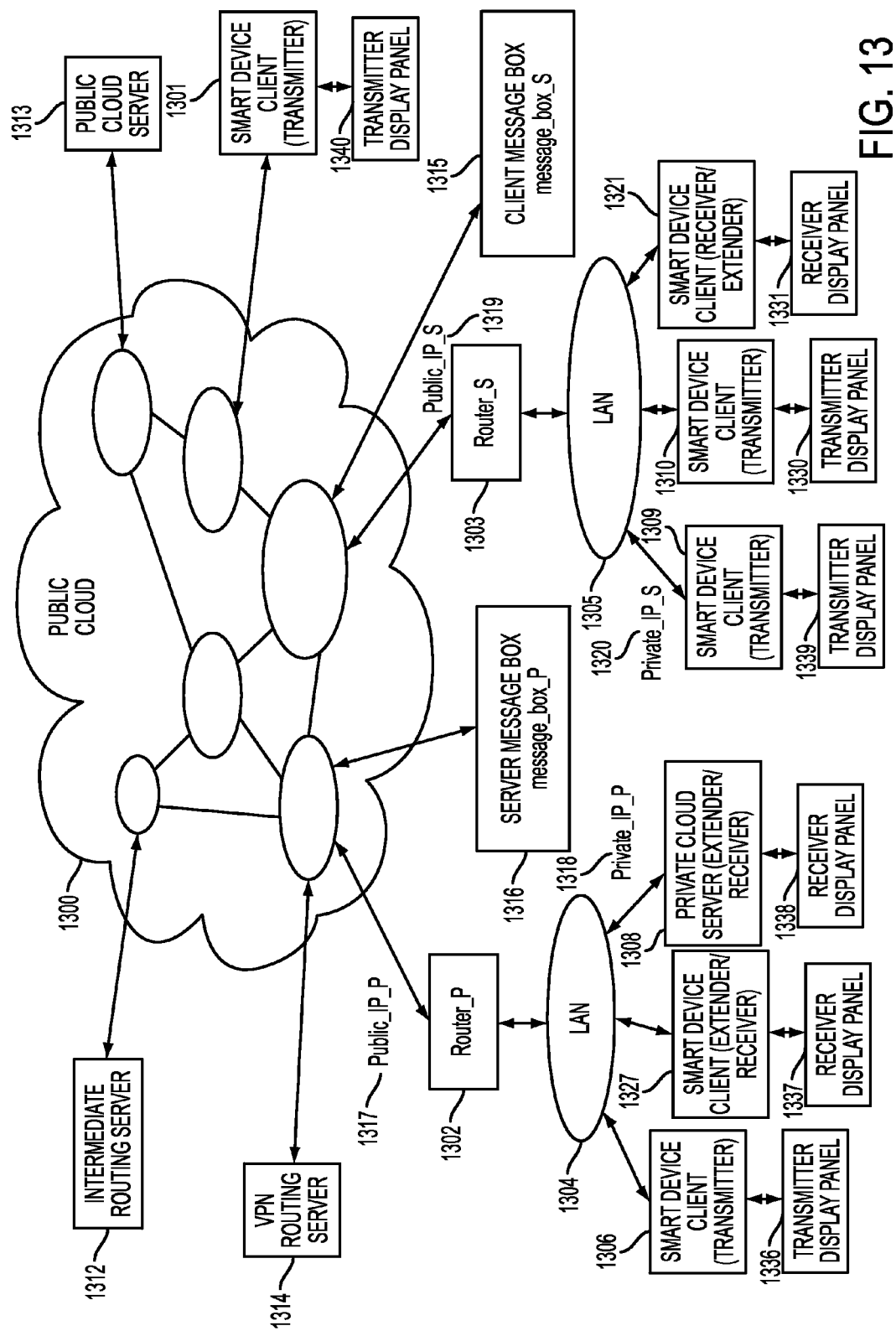
FIG. 13 is a Universal Environment Extender (Receiver) in a cloud Infrastructure

As shown in FIG. 13, the private cloud server 1308 and client 1327, 1321 functions as a receiver. The smart device client 1306, 1309, 1310, 1301 functions as a transmitter. The transmitter and receiver each has a corresponding display panel 1336, 1339, 1330, 1340 and 1337, 1338, 1331. The transmitter and receiver pair can reside on the same LAN 1304 and connect directly wired or wireless, as with transmitter 1306 and receiver 1308, 1327. The transmitter 1301 can also connect to a receiver 1308 behind a Router_P 1302 and LAN 1304 through the WAN and public cloud 1300. The transmitter 1309, 1310 behind a Router_S 1303 and LAN 1305 can connect to a receiver 1308 behind a Router_P 1302 and LAN 1304 through the WAN and public cloud 1300.

While the transmitter and the receiver are on the same LAN 1304, the "choose display" and "reverse mirror/toggle" icons combine to select the active display in one of three combinations of transmitter display panel only, receiver display panel only or both display panels.

While the transmitter 1301, 1309, 1310 and the receiver 1308 are connected through the public cloud 1300, it is beneficial to set the "choose display" option to transmitter display panel such that the played content video, audio, photos or documents can be streamed directly from the source to the transmitter display panel in the cloud access application. Another alternative is to set the "choose display" to the receiver display panel and the "reverse mirror/toggle" to ON such that the receiver display panel is chosen and the transmitter display panel is also turned on to mirror the receiver display panel. This alternative setting is best for streaming the receiver accessible applications from the cloud to the transmitter display panel.

FIG. 13 shows a number of scenarios of the universal environment extender systems. One scenario is between transmitter 1309 which has a Private IP S 1320 and the receiver 1321 on LAN 1305. The source of the content/applications can be from any member on the LAN 1305. The target display panels can be either on the transmitter display panel 1339 itself or on the receiver display panel 1331 or on both transmitter and receiver display panels.

Another scenario is between transmitter 1310 and the receiver 1308 across the cloud 1300 through the LAN 1305 and 1304. The source of the content/applications can be from any member on the LAN 1305 and LAN 1304. The target display panels can be either on the transmitter display panel 1330 itself or on the receiver display panel 1338, 1337 across the cloud 1300 on LAN 1304, or on the receiver panel 1331 on the same LAN 1305, or on both transmitter and receiver display panels.

In the first scenario on LAN, the target display panel can be either the transmitter display panel 1339 itself, or the receiver display panel 1331. The receiver display panel 1331 can be a HDTV, smart watch, smart glasses, smart conference room projector, smart settop box, smart car entertainment system, medical console, or smart gadget that is physically viewable from where the transmitter 1309 is located.

In the second scenario across the WAN or cloud 1300, the transmitter 1310 can view the source content/applications stored on any one member on the LAN 1304 routing through the private cloud server/extender/receiver 1308. The source content/applications can then be viewable either on the transmitter display panel 1330 itself, or on the receiver display panel 1331 on the same LAN. The receiver display panel 1331 can be a HDTV, smart watch, smart glasses, smart conference room projector, smart settop box, smart car entertainment system, medical console, or smart gadget that is physically viewable from where the transmitter 1309 is located.

Alternate Exemplary Embodiment

The universal environment extender can apply to HDTV, smart watch, smart glasses, smart conference room projector, smart settop box, smart car entertainment system, medical console, or smart gadgets.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the present invention.

What is claimed is:

1. A universal environment extender (UEE) system, comprising:
    a smart device comprising a memory and a processor coupled to the memory; and
    a main control utility application running on the smart device, the main control utility application including computer-executable instructions stored in the memory of the smart device, wherein when the main control utility application is executed, the smart device operates as a UEE receiver to:
    receive content location information from another smart device operating as a UEE transmitter to build a reverse content explorer onto the another smart device,
    explore content stored on the smart device and in the network domain accessible to the smart device,
    receive content selection from the another smart device,
    pull at least a portion of the selected content to be streamed directly from the content location without utilizing resources dedicated to the transmitter,
    decrypt the source content,
    determine if the source content is playable on the receiver, and
    play the source content,
    wherein the main control utility application utilizes a virtual user interface (UI) driver to communicate with a non-native operating system of the another smart device.

2. The UEE system of claim 1, wherein the main control utility application provides an autoconfiguration function, which allows the smart device to associate with other smart devices and one or more access points.

3. The UEE system of claim 1, wherein the content includes video, audio, photos and documents in various formats.

4. The UEE system of claim 1, wherein the main control utility allows the smart device operating as a UEE receiver to play an application from a source on a receiver accessible network devices, wherein if the application cannot be executed locally, outside resources are summoned.

5. The UEE system of claim 1, wherein the smart device operating as UEE receiver can be accessed as a private cloud server by the another smart device operating as UEE transmitter, and wherein the UEE transmitter requires no outside or third party routing server in a wireless area network (WAN) and requires no additional router setup in a local area network (LAN) to establish a secure peer-to-peer communication channel with the UEE receiver.

6. The UEE system of claim 1, wherein the smart device further includes:
    a local storage and network storage;
    an I/O connected to video and audio devices;
    a downstream wireless interface;
    a upstream wireless interface;
    an operating system; and
    a virtual user interface (UI) utility that is able to communicate with a virtual UI from the another smart device.

7. A universal environment extender (UEE) transmitter device comprising:
    a smart device comprising a memory and a processor coupled to the memory; and
    a main control utility application executed by the processor, wherein the main control utility application includes:
    a virtual user interface (UI) utility that is able to pair with a UEE receiver device that includes a non-native operating system and to provide a reverse mirror display of the UEE receiver device on the UEE transmitter device;
    a remote control utility to configure and to control the UEE receiver device via a transmitter display panel on the UEE transmitter device; and
    a user interface menu to:
        display, via the reverse mirror display, source content and applications available on the UEE receiver device,
        explore the source content and the applications,
        select at least a portion of the source content and applications,
        designate a target display panel to play the selection, wherein the target display panel is at least one of the transmitter display panel of the UEE transmitter device and a receiver display panel of the UEE receiver device, and
        play the content.

8. The UEE transmitter device of claim 7, wherein the remote control utility includes control of "choose display" and "reverse mirror" to select an active display panel on the UEE transmitter device and the UEE receiver device.

9. The UEE transmitter device of claim 7, wherein the remote control utility includes control of finger mouse, "search left", "play/pause", "search right", "volume down", "volume up", "back to last", "home", "soft keyboard", "reverse mirror/toggle", "choose display" and "shut down" on the display.

10. The UEE transmitter device of claim 7, wherein the remote control utility configures the UEE receiver device to join another wireless network access point (AP) while on a peer-to-peer wireless network with the UEE receiver device.

11. The UEE transmitter device of claim 7, wherein the remote control utility allows the UEE transmitter device to access the UEE receiver device as a private cloud server from anywhere at any time.

12. The UEE transmitter device of claim 11, wherein the private cloud server is behind a firewall with fixed or dynamic IP addresses.

13. The UEE transmitter device of claim 11, wherein, while accessing the UEE receiver device as a private cloud server, the UEE transmitter device can access applications or storage from the UEE receiver.

* * * * *